UNITED STATES PATENT OFFICE.

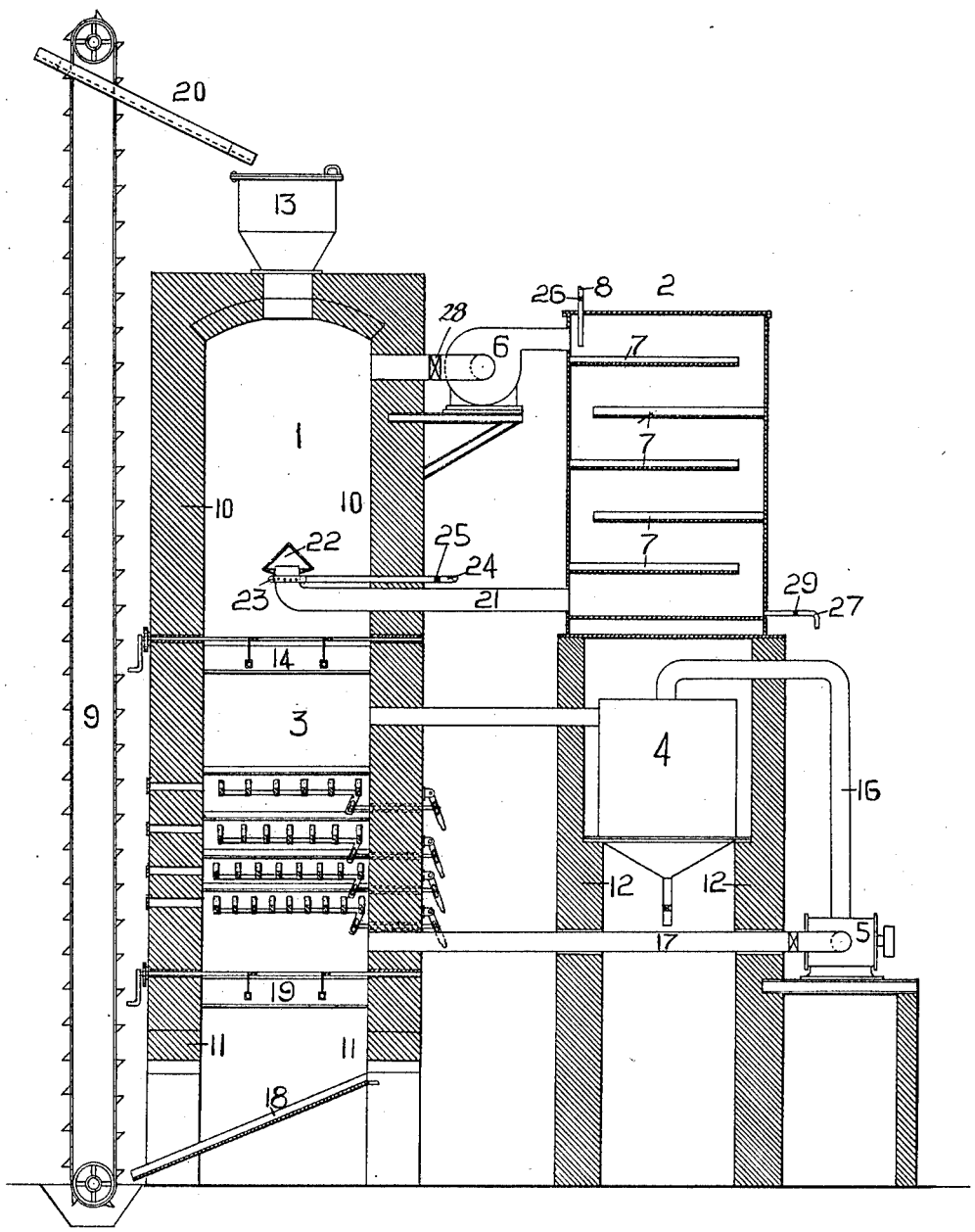

HENRY L. DOHERTY, OF NEW YORK, N. Y.

PROCESS OF HYDRATING LIME.

1,066,718.  Specification of Letters Patent.  Patented July 8, 1913.

Application filed April 20, 1911.  Serial No. 622,358.

*To all whom it may concern:*

Be it known that I, HENRY L. DOHERTY, a citizen of the United States, and a resident of New York city, in the county of New York and State of New York, have invented certain new and useful Improvements in Processes of Hydrating Lime, of which the following is a specification.

This invention relates to a process for hydrating lime and, in particular, to such a process in which the hydration is carried out at a temperature above 212° Fah.

The object of my invention is to furnish a process for hydrating lime by means of steam which is formed by the evaporation of water by the heat developed by the hydrating reaction itself. To this end I carry out the hydration of the lime in an open chamber through which a current of air or other gaseous medium which is substantially non-reactive with quicklime is circulated in a closed circuit. Into this circuit I introduce an evaporating chamber and a fan. The air is heated by the heat developed in the hydration, passes into the evaporating chamber where the greater part of its sensible heat is utilized in the evaporation of water. The air current mixed with the water vapor again enters the lower part of the hydrator, passes up through the charge of lime therein yielding up its steam to the lime to form hydrate, is again raised by the heat of hydration to a comparatively high temperature, again passes through the evaporating chamber, and so on indefinitely. In order to maintain the charge in the hydrator in a condition permeable to the draft current passing therethrough, I feed the charge through the hydrating chamber at a rate greater than the rate at which the lime is hydrated. The mixture of unslaked lime, core, etc., and finely powdered hydrate is subjected to pneumatic separation and the coarse portion returned to the hydrating chamber to be again passed through with the freshly charged lump lime.

The figure in the drawings illustrates a vertical sectional view of my apparatus.

In the accompanying drawings I have shown a form of apparatus suitable for applying my invention.

1 is the hydrating chamber, 2 the evaporator, 3 the dust separator, 4 the bag chamber (or any other suitable form of separator) in which the finely powdered hydrate of lime is separated from the air blast in which it is suspended.

5 is the blower furnishing the air blast for the separation of the fine hydrate from the coarser particles of the mass.

6 is the circulating fan for circulating the air used in the closed hydrating circuit.

8 is a pipe supplying water to the pans 7 of the evaporator 2, the flow of water through 8 being regulated by the valve 26. The water flows from pan to pan, any excess of water collecting in the bottom of the evaporator and being withdrawn through the pipe 27 by opening the valve 29. The hot air in contact with the water in the pans and with the bottoms of the same heats the water and gradually causes its evaporation.

9 is an elevator for raising to the top of the hydrating chamber the coarse material which has passed through the same unhydrated.

The chamber 1 is preferably built with thick walls 10, and supported by the arches 11 at a height sufficient to permit of the construction of the chamber 3 for the pneumatic separation of the hydrate directly under 1. The evaporating chamber 2 is preferably built at a level corresponding to that of chamber 1, in order that the connections from 2 to 1 may be the shortest possible. The bag chamber 4 may advantageously, though not necessarily, be located below 2, within the walls 12 supporting the same.

The lump quicklime is charged into the hydrating chamber 1 from the charging hopper 13. The air-steam current enters the bottom of the hydrator 1, passes up through the lime in the same, yielding up its water vapor to the lime to form hydrate of lime. As the lumps of quicklime take up the water vapor they gradually fall to pieces, the flour-like hydrate being removed from the exterior of the lumps by the mutual attrition which they exert on each other as the mass is caused to pass downward through the hydrating chamber. The lime is usually charged in large lumps. As these lumps pass downward through the hydrating chamber, they continually diminish in size; but I purposely regulate the rate at which I withdraw the material at the bottom of the hydrator, so that the larger lumps are only partially hydrated, or slaked. I thus leave a sufficient proportion of large fragments in the mass to keep the latter in a sufficiently open condition to permit of the ready passage of the draft current.

At intervals I withdraw from the bottom of the hydrator, by opening the discharging doors 14, a portion of the partially hydrated mass. This falls through the pneumatic separator 3, through which an air current is forced by the blower 5. The fine flour-like hydrate is thus winnowed out of the mass and carried into the dust catcher 4 through the pipe 15, where it is filtered out of the air current by bags, or in any other suitable manner, according to the type of dust catcher used. The air freed from its load of hydrate, again passes to the suction side of blower 5 through the pipe 16, discharging from the same through the pipe 17 to the separator 3 as before. The advantage in thus using the separator air in a closed circuit is that the hydrate is thus not exposed to the action of the $CO_2$ of the air. While the possible contamination of the hydrate from using the untreated atmospheric air is not serious, still I find some advantage in this method of using the separator air in a closed circuit. The unhydrated lumps and the particles too coarse to be capable of suspension in the air current are withdrawn from the dust separator 3 through the chute 18 by opening the discharge doors 19 and raised by the elevator 9 to the chute 20. The coarse material passes again into the feed hopper 13 through the chute 20 and is again charged into the hydrator 1 together with the fresh quicklime.

In starting operations, the water for hydration is introduced in the form of steam into the air current passing through the pipe 21, and hood 22, through the perforated pipe 23 which encircles the air pipe 21. Steam is supplied to 23 through the pipe 24 by opening the valve 25. The steam is carried by the air current into the mass in the hydrator and is taken up by the lime to form hydrate. The reaction

$$CaO + H_2O = CaH_2O_2,$$

when the $H_2O$ is supplied as steam liberates 962 B. t. u. (above 32° F.) per pound of CaO reacting. While it is true that at first some steam is condensed, the heat developed prevents any supersaturating of the lime with water. As the operation proceeds, the air which is being circulated in the closed circuit by the blower 6, gradually builds up in temperature. As the air rises in temperature, water is turned on gradually through the pipe 8 to the water pans 7, the admission of steam to the air current through the perforated pipe 23 being gradually shut off. The sensible heat of the air is taken up by the water in the pans 7 with the evaporation of the water. The admission of water is so regulated that the temperature of the air-steam mixture is kept well above the boiling point, to insure that the unavoidable heat losses through the walls of the chambers and pipes shall not result in the reduction of the temperature of the mixture to an extent that will cause condensation of the steam in the lower part of the hydrator 1, with the production of a wet hydrate. When the temperature of the circulating air has reached a point such, that its sensible heat is sufficient to evaporate the proportion of water required in the hydration, the valve 25 is closed and the valve 26 on pipe 8 is set so that the proper proportion of water is injected into the heated air current. As the temperature of the air rises, the rapidity of the circulation of the air current may be cut down. If the volume of air circulated (or rather the rapidity of circulation) were maintained as at the start, the temperature in the hydrator would ultimately build up to the temperature at which the hydrating reaction would be reversed. I control the temperature in the hydrator by varying the rate of circulation. When the temperature has once been brought up to the proper plane, I regulate the volume of air passed through the hydrator so that the volume passed will have a heat capacity sufficient to take up the quantity of heat that will be required to vaporize the requisite amount of water and to supply radiation losses. Instead of varying the rate of circulation of the air I may vary the temperature at which the air-steam current enters the hydrator by supplying an excess of water to the water pans.

When my present invention is used in connection with the calcination of the lime, in the manner described and claimed in a copending application Serial No. 625,357 filed April 20th, 1911, the hydrating chamber 1 is located directly below the cooler of the kiln. The lime is drawn from the cooler and charged directly into the hydrator. The volume of air supplied, in this case, is the sum of that which is required to support the combustion in the kiln and to carry the requisite amount of heat into the evaporator. By properly adjusting the damper 28 the relative proportions of the air drawn from the hydrator and that from the atmosphere by the blower 6 may be so adjusted that the proper volumes, specified above, are secured from each source. The excess of air over that in circulation after being heated in the hydrating chamber passes on up into the cooler of the kiln, through the hot lime therein, and on up to the combustion zone of the kiln. The excess heat may also be utilized by passing the hot air from the hydrator through the flues of an economizer or other form of feed water heater where the surplus heat is extracted before the air is passed into the evaporator. In this case the volume of air circulated is regulated to the quantity required to maintain the temperature in the hydrator at the proper point, and the quantity of water supplied to the pans to that required in the hydration of the lime.

Having described my invention, what I claim is:—

1. In the heating and treating of material, the process which comprises transmitting a solid material to be changed through a reaction zone under conditions suitable for effecting the change in said material desired, at a regulated rate of transmission materially greater than the rate of said change, whereby unchanged material passes through said zone, the said rate of transmission being regulated to that required to insure the passage through said reaction zone of sufficient unchanged material to maintain a proportion of voids in the material in said zone that will permit comparatively free passage of a draft current, separating changed material from unchanged material coming from said zone, admixing fresh material with said unchanged material, and passing the mixture through said zone.

2. In the manufacture of hydrated lime, the process which comprises, transmitting quicklime through a hydrating region at a regulated rate, transmitting through said hydrating region a draft current of air mixed with a proportion of water vapor in excess of that existing in atmospheric air, the rate of transmission of said quicklime through said region being at a rate so much greater than the rate at which said quicklime is hydrated that sufficient unchanged quicklime will be carried through said zone to maintain a sufficient proportion of voids in the partially hydrated mass to permit the comparatively free passage of said draft current, separating unchanged lime from the hydrated lime, admixing fresh quicklime with the unchanged lime and passing the mixture through said region.

3. The method of manufacturing lime hydrate, which consists in circulating air in a closed circuit first through a mass of quicklime contained in a closed chamber and then through an evaporating chamber in contact with water to form a mixture of air and water vapor, and transmitting quicklime through said closed chamber at a rate materially greater than the rate at which said quicklime is hydrated therein.

4. In the hydration of lime the process which comprises, transmitting quicklime through a hydrating region at a rate materially greater than the rate at which said lime is hydrated, whereby the body of hydrating lime in said region is maintained in a condition permeable to the draft current passing through said region, continuously circulating a gaseous medium which is substantially non-reactive with quicklime in a closed circuit through said hydrating region and an evaporating region containing water, to take up heat developed by the hydration of said lime, to transfer the said heat to water in said evaporating region to evaporate said water and to form an admixture of water vapor with said gaseous medium, and to transport the so-formed water vapor into contact with said quicklime in said hydrating region, whereby the said quicklime is subjected to hydration by water vapor diffused through a body of diluent gas, separating unchanged quicklime from hydrated lime, admixing fresh quicklime with said unchanged lime, and passing the mixture through said hydrating region.

Signed at New York city in the county of New York and State of New York.

HENRY L. DOHERTY.

Witnesses:
 FRANK L. BLACKBURN,
 THOS. I. CARTER.